G. W. FRAZIER.
RADIATOR.
APPLICATION FILED DEC. 28, 1914.
1,189,357.
Patented July 4, 1916.
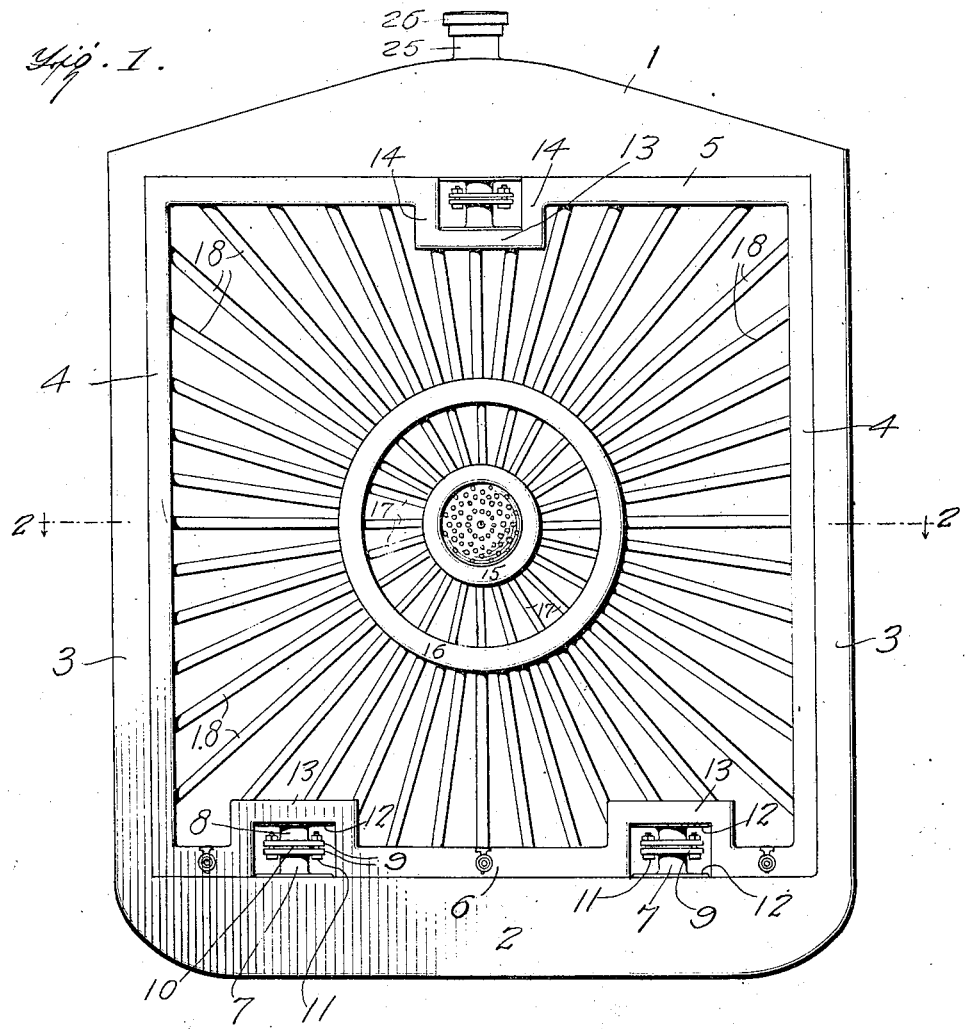
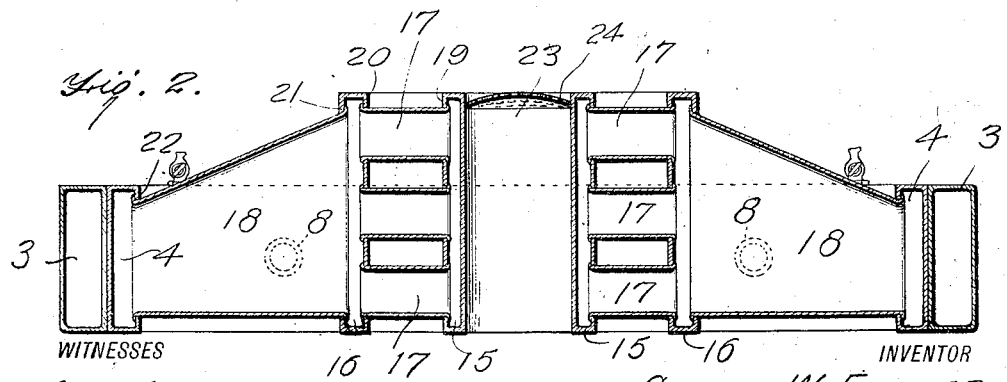
WITNESSES
INVENTOR
GEORGE W. FRAZIER,
BY Munn & Co.
ATTORNEYS

UNITED STATES PATENT OFFICE.

GEORGE WASHINGTON FRAZIER, OF OAKLAND, CALIFORNIA.

RADIATOR.

1,189,357.  Specification of Letters Patent.  Patented July 4, 1916.

Application filed December 28, 1914. Serial No. 879,316.

*To all whom it may concern:*

Be it known that I, GEORGE W. FRAZIER, a citizen of the United States, and a resident of Oakland, in the county of Alameda and State of California, have invented a new and useful Improvement in Radiators, of which the following is a specification.

My invention is an improvement in radiators, and has for its object to provide a device of the character specified, especially adapted for motor vehicles, wherein the radiator is of that character shown in my copending application, Serial No. 879,315, filed December 28, 1914, that is, the said radiator is detachable and removable from the vehicle, and wherein a particular type of connection is provided, together with a particular type of radiator.

In the drawings:—Figure 1 is a front view of the improved radiator, and Fig. 2 is a section on the line 2—2 of Fig. 1, looking in the direction of the arrows adjacent to the line.

In the present embodiment of the invention, the improved radiator comprises an outer section and an inner section, each in the form of a rectangular frame, the outer section or frame consisting of upper and lower cross members 1 and 2, and side members or columns 3, the columns connecting the adjacent ends of the upper and lower members to form a continuous receptacle. The outer frame is adapted for connection with the water jacket of the engine.

The inner frame consists of side members or columns 4, an upper connecting cross member 5 and a lower connecting cross member 6, the members 4, 5 and 6 being continuous and forming a continuous receptacle or holder for the water. The inner frame is of a size to fit within the outer frame as shown, and the said inner frame is connected to the upper member 1 and to the lower member 2 of the outer frame. The connections are similar, one connection being arranged between the adjacent members 1 and 5 of the frame, and two connections being arranged between the adjacent members 2 and 6. Each of the said connections comprises a pair of connecting or coupling sleeves 7 and 8, each of the said sleeves having a marginal flange 9 at its meeting end, and the ends of the sleeves abut, a gasket 10 being arranged between the flanges 9, and bolts and nuts 11 are passed through registering openings in the flanges outside of the gasket. The nuts are turned to tighten the flanges on the gasket to make a fluid tight joint, and each of the nipples or coupling members 7 and 8 has a marginal extension 12 at its outer end for connection with the adjacent member 1, 2, 5 or 6, as the case may be. Each of the coupling members 7 and 8 is arranged around an opening in the adjacent member of the frame, so that there is a free circulation through the coupling members between the frames. It will be noted that the members 5 and 6 of the inner frames have inwardly offset portions 13 at the couplings, the said inwardly offset portions being connected to the members at each end by a connection 14. Thus a space or recess is provided between the frames at the coupling for receiving the coupling. The inner section comprises in addition inner and outer ring portions 15 and 16, respectively, each of the ring portions being in fact an annular casing, and the inner ring portion is connected to the outer ring portion, while the outer ring portion is connected to the frame of the inner section in a manner to be described Tubes 17 connect the inner ring portion to the outer ring portion and tubes 18 connect the outer ring portion with the frame 4—5—6. The tubes 17 are of uniform cross section, while the tubes 18 are tapering, being arranged with their small ends outwardly. It will be noted from an inspection of Fig. 2 that the ring portions 15 and 16 are of the same width, and of greater width than the frames, the frames being of equal width. Thus the central portion of the radiator is extended rearwardly, so that in cross section the radiator has a frusto-pyramidal contour.

The tubes 17 which connect the inner ring 15 with the outer ring 16 are arranged in series transversely of the radiator, three tubes being provided in each series in the present instance. The tubes have their ends inserted in registering openings 19 and 20 in the rings 15 and 16, respectively, and the ends are then expanded as shown to prevent displacement thereof in either direction. The tubes 18 are similarly arranged, each tube having its large end inserted in an opening 21 in the periphery of the outer ring, and having its small end inserted in an opening 22 in the inner surface of the inner frame. Thus there is a free circulation of water between the rings 15 and 16, and between the said rings and the inner frame, and there is a circulation of the water from the outer frame to the inner frame by way of the connections 7—8. It will be noted from an inspection of Fig. 1 that the tubes 17 radiate in every direction from the inner ring 16 and that similarly the tubes 18 radiate in every direction from the outer ring 15 to the inner frame 4—5—6. That portion 23 of the radiator within the interior of the inner ring 16 is open for the circulation of air, and the air is free to pass between and around the tubes 18 and between and around the tubes 17, as well as between and around the rings 15 and 16 and the inner frame.

A concavo-convex shield or hood 24 is arranged within this space 23 at one end thereof, the said shield or hood being of perforate material and having its convex face outwardly. The upper member 1 of the outer frame is provided with the usual filling nipple 25, having the cap 26. Preferably the tubes 17 and 18 are of corrugated material, that is, the walls of the tubes are corrugated to provide a larger radiating surface.

The inner section of the radiator is the radiator proper, that is, it is this portion of the radiator which does the cooling of the water, and it will be evident that the said portion may be easily detached and released from the holding frame or outer section, merely by removing the bolts 11. The entire cooler or radiator proper may be then slipped outward from within the holding frame. All that part of the radiator which is liable to get out of order or to be injured is detachable and removable, and it is not necessary to dismantle the vehicle to obtain access to the radiator.

It will be evident that the cooling tubes of the improved radiator might be arranged in many different manners, and might vary greatly in size and capacity without departing from the spirit of the invention.

The improved radiator consists in effect of a supporting frame, and a radiator proper adapted and arranged to fit within the supporting frame, the frame and the radiator having inter-engaging means for permitting them to be connected together operatively and to secure the radiator proper in place in its supporting frame.

It will be evident from the description that the radiator body may be moved out of the frame by moving the said body laterally with respect to the plane of the body and frame, the arrangement being such that the body is detached by a forward movement in the present instance.

It will be evident that the supporting frame is not necessarily rectangular, since it is obvious that it might be circular or have any other contour provided that the cooler or radiator proper had its exterior shaped to fit within the supporting frame.

It will be noticed that the improved radiators have drain valves at their lowest point for permitting the radiator proper to be drained to prevent freezing and the like. The concavo-convex shields are at the front of the radiators.

I claim:—

1. A radiator, comprising a substantially rectangular tubular supporting frame adapted for connection with the engine to be cooled and a radiator body fitting within the frame and having inwardly offset portions at its top and bottom and detachable couplings between the inwardly offset portions and the supporting frame for operatively connecting the cooler to the supporting frame, each of the said couplings comprising nipples connected with the supporting frame and the inwardly offset portions of the cooler frame at one end and abutting at the other end.

2. A radiator, comprising a substantially rectangular tubular supporting frame adapted for connection with the engine to be cooled and a body fitting within the supporting frame and having inwardly offset portions at its top and bottom, and detachable couplings between the inwardly offset portions and the supporting frames for operatively connecting the cooler to the supporting frame.

3. A radiator, comprising a tubular supporting frame adapted for connection with the engine to be cooled, a radiator body comprising a continuous tubular frame fitting within the supporting frame and cooling tubes within the frame of the body, said body frame being movable into and out of the supporting frame laterally with respect to the plane of the frame and body, and the said body frame having inwardly offset portions, and the supporting frame and the body frame having detachable water couplings at the inwardly offset portion for operatively connecting the frames and for holding the body in place in the supporting frame.

4. A radiator comprising a tubular inclosing frame, a central receptacle of annular form and cooling tubes radiating from the central receptacle to the frame for connecting the interior of the receptacle to the frame, said tubes being of approximately the same thickness throughout their length and gradually increasing in width from the frame to the central receptacle.

5. A radiator, comprising a tubular supporting frame, and a radiator body shaped to fit and approximately fill the frame and moveable into and out of the frame laterally with respect to the plane of the frame and body, the body having inwardly offset portions at its top and bottom, and said supporting frame and body having detachable couplings at the inwardly offset portions for operatively connecting the body with the supporting frame and for preventing lateral movement of the body.

6. A radiator, comprising a tubular inclosing frame, a radiator body shaped to fit and approximately fill the frame and movable into and out of the frame laterally with respect to the plane of the frame and body, and detachable connections between the body and the frame, one of the said elements having inwardly offset portions or recesses for operatively connecting the body with the supporting frame and for preventing lateral movement of the body in the frame.

GEORGE WASHINGTON FRAZIER.

Witnesses:
  Adam T. Tunley,
  William G. Furber.

Copies of this patent may be obtained for five cents each, by addressing the "Commissioner of Patents, Washington, D. C."